(12) United States Patent
Broden

(10) Patent No.: US 7,117,745 B2
(45) Date of Patent: Oct. 10, 2006

(54) PROCESS SEAL FOR PROCESS CONTROL TRANSMITTER

(75) Inventor: David A. Broden, Andover, MN (US)

(73) Assignee: Rosemount Inc., Eden Prairie, MN (US)

( * ) Notice: Subject to any disclaimer, the term of this patent is extended or adjusted under 35 U.S.C. 154(b) by 236 days.

(21) Appl. No.: 10/774,867

(22) Filed: Feb. 9, 2004

(65) Prior Publication Data

US 2005/0172738 A1  Aug. 11, 2005

(51) Int. Cl.
*G01L 9/00* (2006.01)

(52) U.S. Cl. ............................................. 73/706; 92/98

(58) Field of Classification Search .................. 73/700, 73/706, 756; 361/283; 92/98
See application file for complete search history.

(56) References Cited

U.S. PATENT DOCUMENTS

| 3,974,855 | A |   | 8/1976  | Webb ......................... 137/527 |
|-----------|---|---|---------|---------------------------------------|
| 4,005,848 | A |   | 2/1977  | Eggleston ................... 251/173  |
| 4,046,010 | A |   | 9/1977  | Akeley ........................ 73/406 |
| 4,231,546 | A |   | 11/1980 | Eggleston et al. ........... 251/173   |
| 4,798,089 | A |   | 1/1989  | Frick et al. ................... 73/706 |
| 4,833,922 | A |   | 5/1989  | Frick et al. ................... 73/756 |
| 4,993,754 | A |   | 2/1991  | Templin, Jr. ................. 285/189 |
| 5,094,109 | A |   | 3/1992  | Dean et al. .................... 73/718 |
| 5,095,755 | A |   | 3/1992  | Peterson ....................... 73/706 |
| 5,184,514 | A |   | 2/1993  | Cucci et al. ................... 73/706 |
| 5,427,358 | A |   | 6/1995  | Eggleston et al. ........... 251/367   |
| 5,487,527 | A |   | 1/1996  | Eggleston ..................... 251/62  |
| 5,524,492 | A |   | 6/1996  | Frick et al. .................... 73/706 |
| 5,922,965 | A | * | 7/1999  | Behm et al. .................. 73/706   |
| 5,955,675 | A | * | 9/1999  | Peterson ....................... 73/706 |
| 6,038,961 | A | * | 3/2000  | Filippi et al. ............... 92/98 R  |
| 6,055,863 | A | * | 5/2000  | Behm et al. .................. 73/706   |
| 6,539,808 | B1| * | 4/2003  | Saenz et al. .................. 73/756  |
| 2002/0014123 | A1 |  | 2/2002 | Saenz et al. .................. 73/715  |

FOREIGN PATENT DOCUMENTS

EP       0 403 256 A2    12/1990
JP          2280026       11/1990

* cited by examiner

*Primary Examiner*—Edward Lefkowitz
*Assistant Examiner*—Andre Allen
(74) *Attorney, Agent, or Firm*—Westman, Champlin & Kelly P.A.

(57) ABSTRACT

A process control instrument for coupling to a process is attachable to a metal flange. The flange has a first passageway adapted to be filled with process fluid. The process control instrument includes a body having an opening adjacent to the first passageway for receiving process fluid from the first passageway when the process control instrument is attached to the flange. A diaphragm is disposed across the opening for fluid communication with the process fluid. A seal is positionable against the flange to prevent process fluid from leaking past the flange and diaphragm. The seal includes a ring positioned in the opening and coupled to the body, the ring being substantially in contact with the diaphragm along an inner annular shoulder when the body is not attached to the flange (unloaded).

18 Claims, 6 Drawing Sheets

PROCESS SEAL FOR PROCESS CONTROL TRANSMITTER

BACKGROUND OF THE INVENTION

The present invention relates to a process control transmitter. In particular, it relates to a process seal for a process control transmitter.

Transmitters which sense pressure typically have a pressure sensor coupled to at least one isolation diaphragm. The isolation diaphragm isolates the pressure sensor from corrosive process fluids being sensed. Pressure is transferred from the isolation diaphragm to the sensor having a sensing diaphragm through a substantially incompressible isolation fluid carried in a passageway. U.S. Pat. No. 4,833,922 entitled MODULAR PRESSURE TRANSMITTER and U.S. Pat. No. 5,094,109 entitled PRESSURE TRANSMITTER WITH STRESS ISOLATION DEPRESSION show pressure transmitters of this type.

The process fluid sealing mechanism for a transmitter should be operable in a wide range of chemical environments, temperature ranges and stress conditions and work well over a broad range of pressures. Teflon® and other fluorocarbons are among the preferred sealing compounds. Hastelloy®, 316 stainless steel and other corrosion resistant materials are preferred as construction materials for wetted surfaces. While these materials have very good corrosion resistance properties, their mechanical properties, such as yield strength of the corrosion resistant alloys and the resistance to extrusion of the sealing materials, are marginal at best. Sealing material tends to extrude when subjected to high pressures and temperatures. For this reason, the sealing material must be treated as a gasket. To form effective seals with gaskets, it is usually necessary to have a sealing material with a large surface area under significant compression. The stress from compression is mechanically coupled to the isolation diaphragm and ultimately to the sensing diaphragm of the pressure transmitter. The amount of stress can vary over time as mounting bolts loosen or are re-torqued, and as the gasket sealing material extrudes. These changes result in instabilities in the pressure sensor output.

To minimize the stress coupled to the process isolation diaphragm, it is preferred to separate the diaphragm from the sealing mechanism to provide stress isolation. However, practical considerations make stress isolation of the diaphragm difficult. Industry standards and the requirement of backward compatibility with existing products dictate the size, location and pattern of the bolts and pressure ports of the assembly. The overall geometry of the transmitter limits the space that must be shared by the process sealing gaskets and the isolating diaphragms. The process isolation diaphragms must fit within the boundaries defined by the bolt pattern. Space within the bolt boundary used for sealing is generally unavailable for isolation diaphragms. It is frequently undesirable to reduce the size of the isolation diaphragms because smaller isolation diaphragms are more sensitive to stress coupling and therefore instabilities result.

Tradeoffs must typically be made among the several competing needs of the pressure transmitter design: 1) the need for large compliant diaphragms; 2) the need for diaphragms that are well isolated from the stresses of the sealing mechanism; 3) the need for a sealing mechanism that has sufficient surface area; 4) the need for a sealing mechanism held together with sufficient force to be reliable; and 5) the constraint that all structures fit within the boundary defined by the bolt pattern.

One technique which addresses some of these concerns is shown and described in U.S. Pat. No. 5,955,675, which issued Sep. 21, 1999 to Peterson entitled SELF ENERGIZING PROCESS SEAL FOR PROCESS CONTROL TRANSMITTER which is commonly assigned with the present application. This reference describes a technique in which process pressure is used to assist in sealing a process seal to a flange. The process seal has a ring shape and sealing material is coupled to the ring along its inner diameter. The ring is adapted to force the sealing material into contact with the flange to prevent process fluid from leaking past the seal. U.S. Pat. Nos. 5,922,965 and 6,055,863, entitled PRESSURE SENSOR AND TRANSMITTER HAVING A WELD RING WITH A ROLLING HINGE POINT, and PRESSURE SENSOR AND TRANSMITTER HAVING A WELD RING WITH A ROLLING HINGE POINT, issued Jul. 13, 1999 and May 2, 2000, respectively, also describe process seals.

SUMMARY OF THE INVENTION

A process control instrument for coupling to a process is attachable to a metal flange. The flange has a first passageway adapted to be filled with process fluid. The process control instrument includes a body having an opening adjacent to the first passageway for receiving process fluid from the first passageway when the process control instrument is attached to the flange. A diaphragm is disposed across the opening for fluid communication with the process fluid. A seal is positionable against the flange to prevent process fluid from leaking past the flange and diaphragm. The seal includes a ring positioned in the opening and coupled to the body, the ring being substantially in contact with the diaphragm along an inner annular shoulder when the body is not attached to the flange (unloaded).

A method of attaching a seal to a process transmitter is also provided which includes preloading the seal to urge an inner annular portion of the seal against an isolation diaphragm of the transmitter. The method further includes attaching the seal to the transmitter while applying the preloading and removing the preloading following the attaching whereby an annular shoulder of the seal remains in contact with the diaphragm.

DETAILED DESCRIPTION

Figure 1:
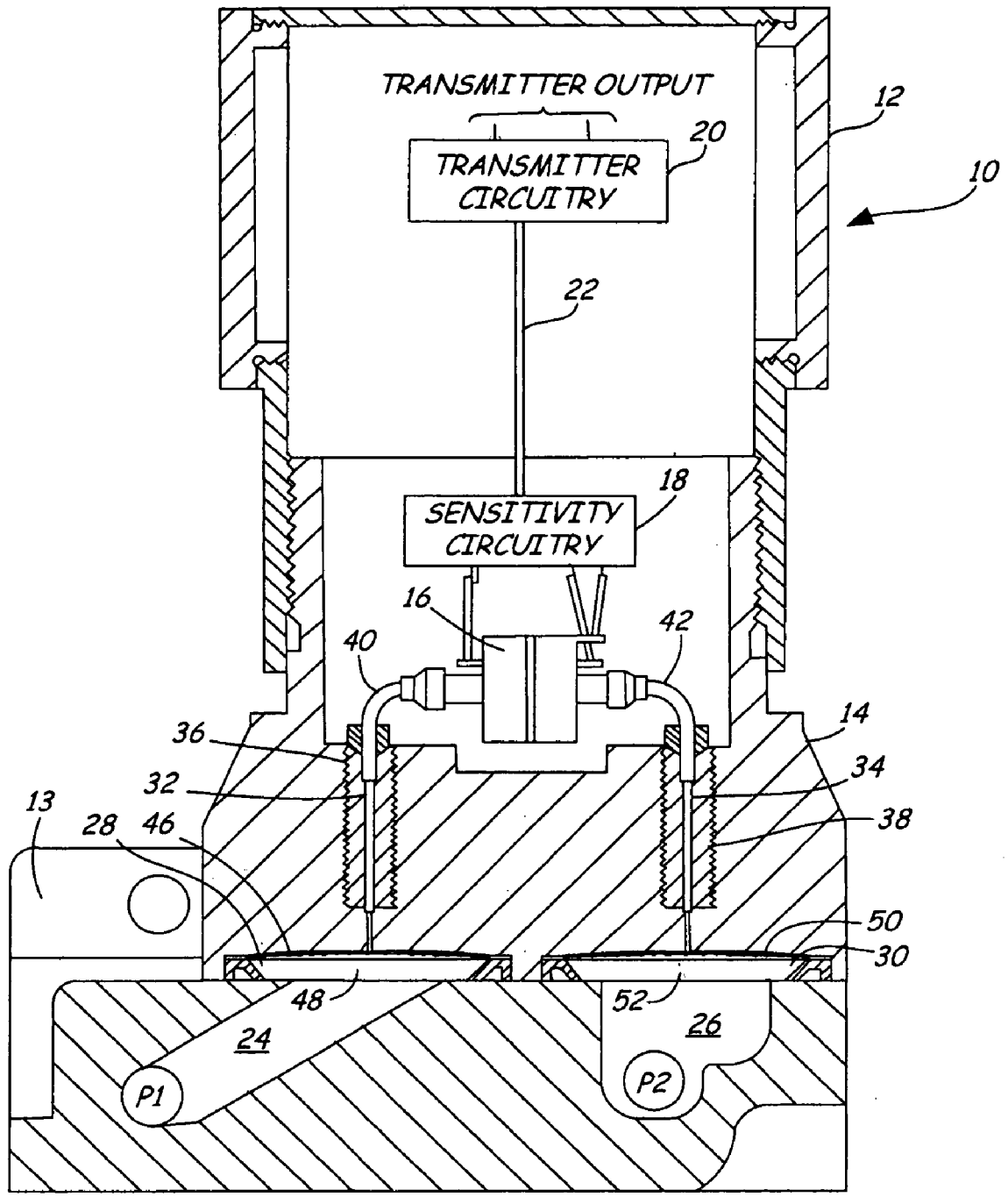
FIG. 1 is a cross-sectional fragmentary view of a pressure transmitter having a process seal in accordance with the present invention.

FIG. 1 shows an exemplary pressure transmitter 10 having transmitter body 12, coupling flange or manifold 13 and sensor body 14 in accordance with the present invention. Although the present invention is shown with a Coplanar™ flange, the invention may be used with any type of flange, manifold, or other coupling adapted to receive process fluid. Sensor body 14 includes pressure sensor 16, and transmitter body 12 includes transmitter circuitry 20. Sensor circuitry 18 is coupled to transmitter circuitry 20 through communication bus 22. Transmitter circuitry 20 sends information related to pressure of the process fluid over a communication link such as a two wire process control loop 23 (or circuit). The transmitter 10 may be wholly powered over the control loop 23 by a controller 25.

In one embodiment of a transmitter, pressure sensor 16 measures a difference in pressure between pressure P1 in passageway 24 and pressure P2 in passageway 26 of flange 13. Pressure P1 is coupled to sensor 16 through passageway 32. Pressure P2 is coupled to sensor 16 through passageway 34. Passageway 32 extends through coupling 36 and tube 40. Passageway 34 extends through coupling 38 and tube 42. Passageways 32 and 34 are filled with a relatively incompressible fluid such as oil. Couplings 36 and 38 are threaded into sensor body 14 and provide a long flame-quenching path between the interior of the sensor body carrying sensor circuitry 18 and process fluid contained in passageways 24 and 26.

Passageway 24 is positioned adjacent to opening 28 in sensor body 14. Passageway 26 is positioned adjacent to opening 30 in sensor body 14. Diaphragm 46 is positioned in opening 28 and is coupled to sensor body 14 adjacent to passageway 24. Passageway 32 extends through coupling 36 and sensor body 14 to diaphragm 46. Diaphragm 50 is coupled to sensor body 14 adjacent to passageway 26. Passageway 34 extends through coupling 38 and sensor body 14 to diaphragm 50.

In operation, flange 13 presses against seals 48 and 52 when transmitter 10 is bolted to flange 13. Seal 48 is seated on sensor body 14 adjacent to opening 24 and diaphragm 46, and prevents process fluid leakage from passageway 24 and opening 28 past flange 13 to the outside environment. Similarly, seal 52 is coupled to sensor body 14 adjacent to opening 26 and diaphragm 50, and prevents process fluid leakage from passageway 26 and opening 30 past flange 13 to the outside environment. Seals 48 and 52 are configured in accordance with the present invention. The configuration of seals 48 and 52 is discussed in greater detail below with reference to FIGS. 4-5B.

Figure 2:
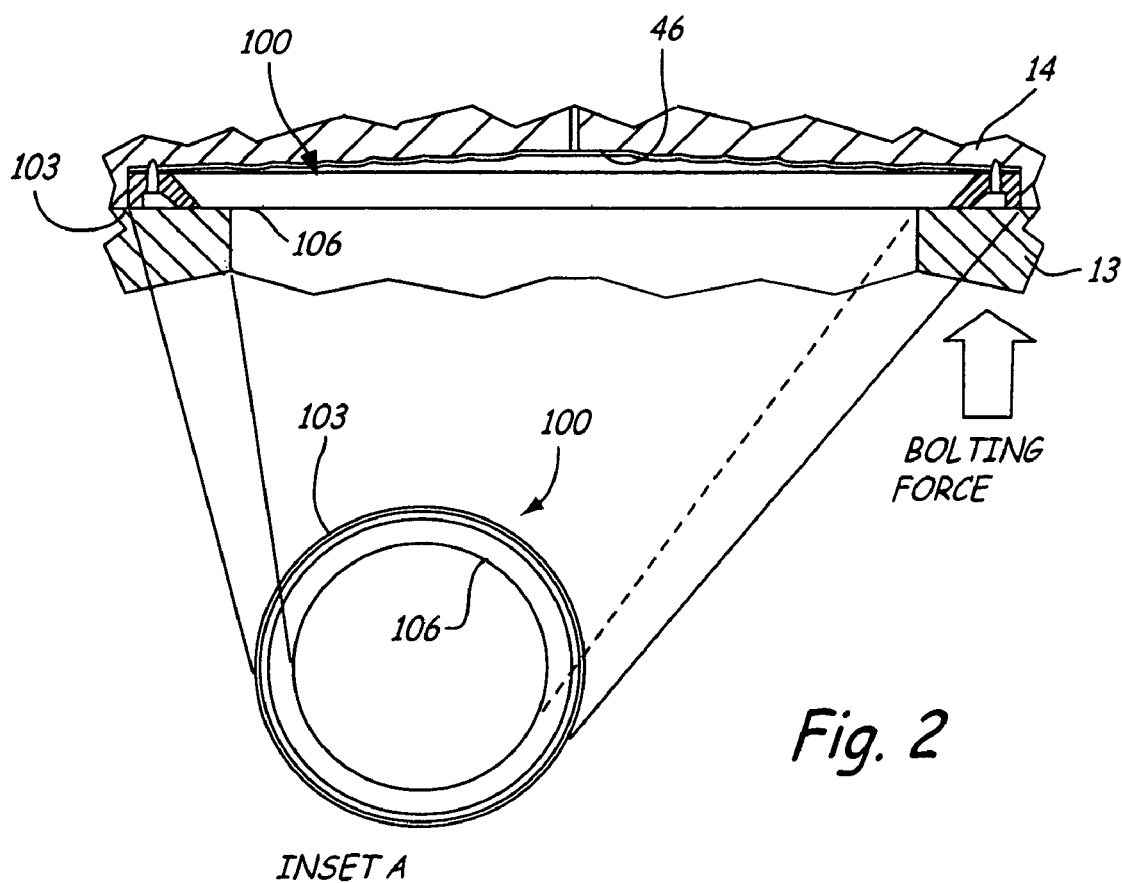
FIG. 2 is a cross-sectional view of a prior art seal.
Figure 3A:
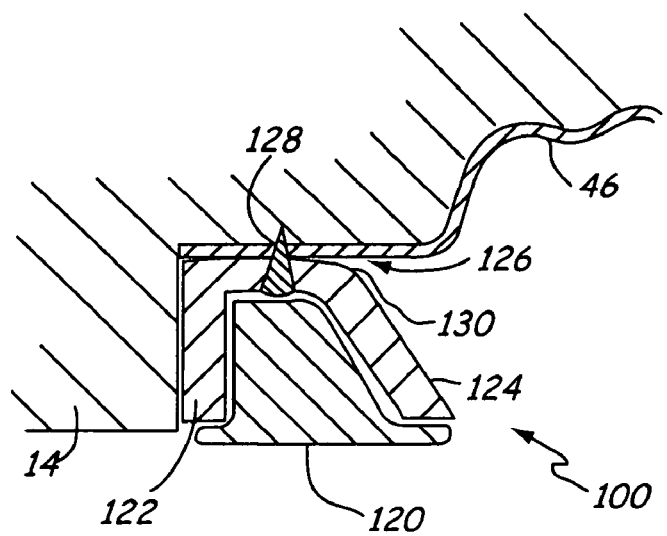
FIGS. 3A and 3B are more detailed cross-sectional views of the prior art seal shown in FIG. 2.
Figure 3B:
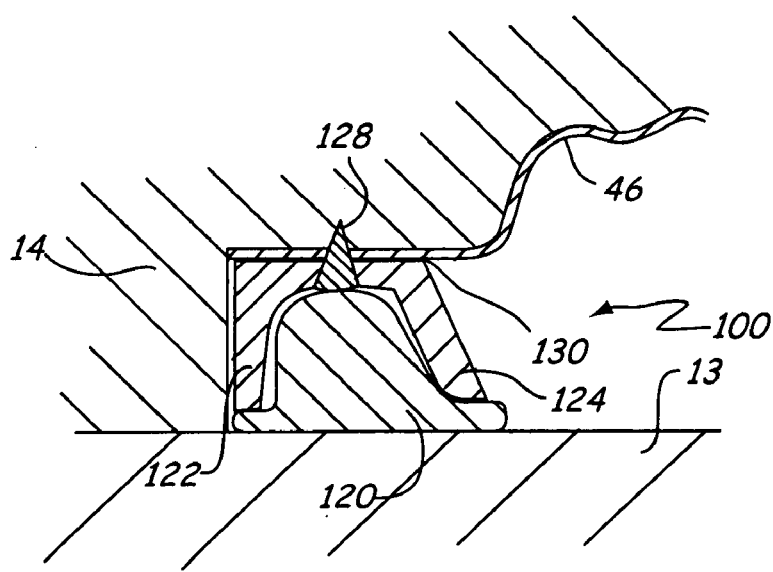

FIG. 2 is a cross sectional view of a portion of transmitter 14 and flange 13 showing a prior art seal 100. FIGS. 3A and 3B are more detailed cross sectional views of prior art seal 100. The seal 100 is adapted to be positionable against the surface of flange 13 for preventing process fluid from leaking past the flange. As illustrated in inset A of FIG. 2, which is a top plan view of seal 100, the seal 100 comprises a metal ring having an outer diameter 103 and an inner diameter 106.

In the cross-sectional view of FIG. 2 shown in FIG. 3A, the seal 100 is shown to include an outer circumference 122 and an inner circumference 124 which forms a cavity therebetween filled by sealing material 120. The seal 100 is coupled to transmitter 14 through, for example, a weld 128.

One aspect of the present invention includes the recognition that a gap 126 of a prior art seal can be formed during the manufacturing process between an interior diameter shoulder 130 of seal 100 and an outer circumference of diaphragm 46. This introduces a variability in the force applied to the diaphragm 46. This gap 126 is formed by weld distortions arising from weld 128. For example, if the diaphragm 46 and seal 100 are held in position by a clamp which applies a load during a welding process, the contraction of the weld 128 (for example during cooling) causes the metal ring of seal 100 to pull inward, thereby lifting the metal ring along the shoulder 130 away from the diaphragm 46. This changes the contact area and causes the contact area to become uneven.

FIG. 3B shows the same cross-sectional view as illustrated in FIG. 3A with the addition of process flange forced against seal 100. This can be through clamping, bolting or other techniques. As illustrated in FIG. 3B, the load from the process flange 13 causes the shoulder 130 to be pushed against diaphragm 46 thereby eliminating, or at least altering, the dimensions of gap 126. Thus, the gap 126 causes the diaphragm and seal assembly to be highly susceptible to bending or other deformation in response to the application of differing bolt and flange loads. This bending or movement is transferred to the diaphragm 46 and ultimately introduces errors into pressure measurements.

The present invention provides a technique to reduce errors introduced due to the gap 126 caused by weld contraction, or which may arise due to other sources. The weld contraction can be, for example, due to cooling of the weld or surrounding material. The present invention provides a configuration to ensure that the contact along the inner diameter shoulder of the diaphragm is substantially consistent and stable, regardless of the loading force applied to the seal. This is achieved by reducing, or substantially eliminating, the gap 126 shown in FIG. 3A when the seal is in an unloaded condition by insuring contact at an inner annular area. In some configurations, the present invention can reduce errors due to the mounting force from a flange by 50% to 75% when compared to the prior art configurations shown in FIGS. 2, 3A and 3B.

Figure 4:
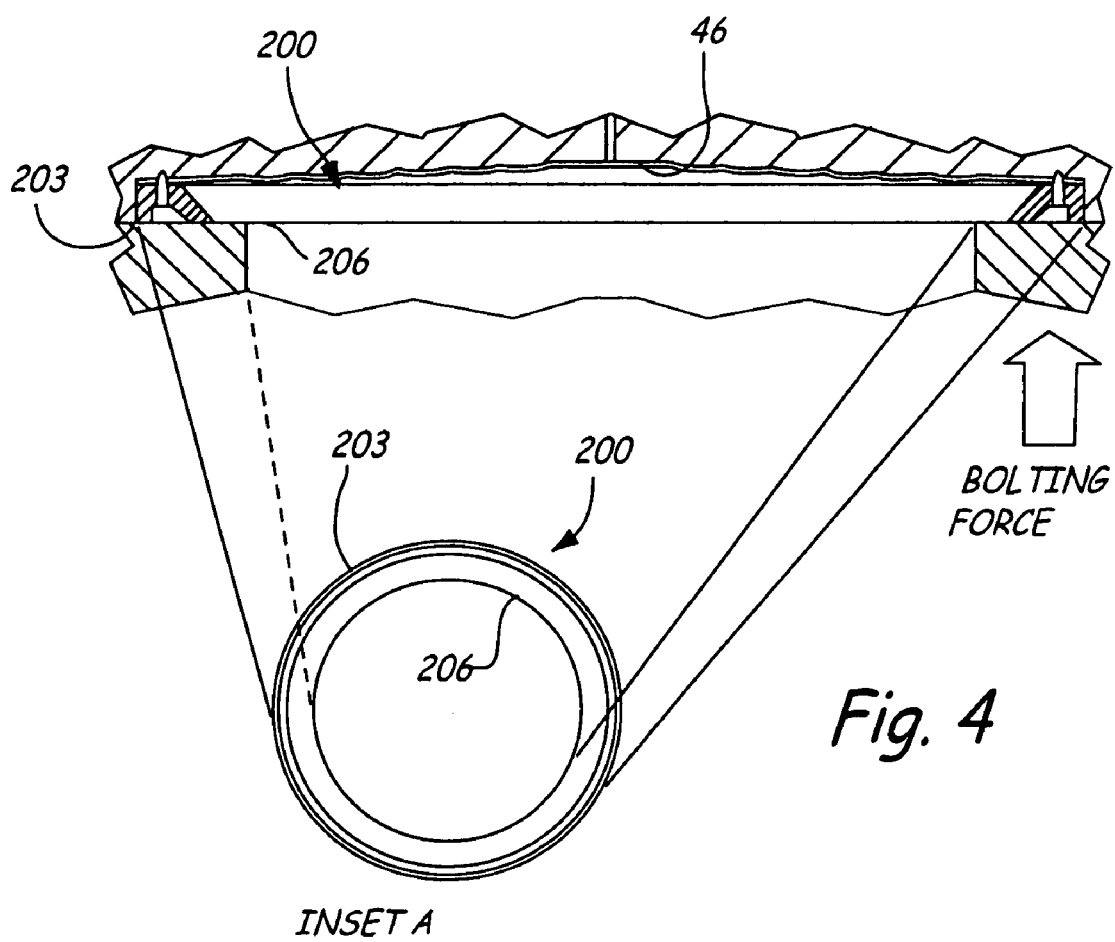
FIG. 4 is a cross-sectional view of a portion of the transmitter in flange in FIG. 2 which illustrates a seal.
Figure 5A:
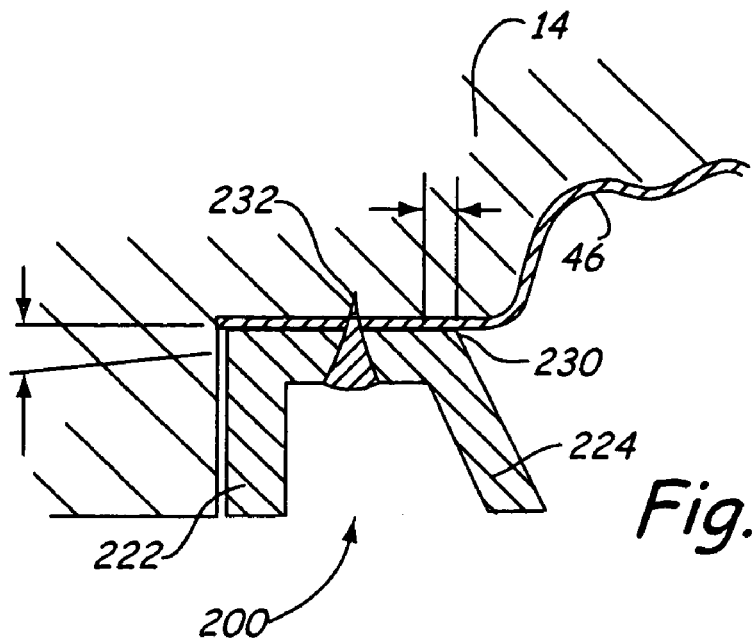
FIGS. 5A and 5B are cross-sectional views of one embodiment of a seal according to the present invention.
Figure 5B:
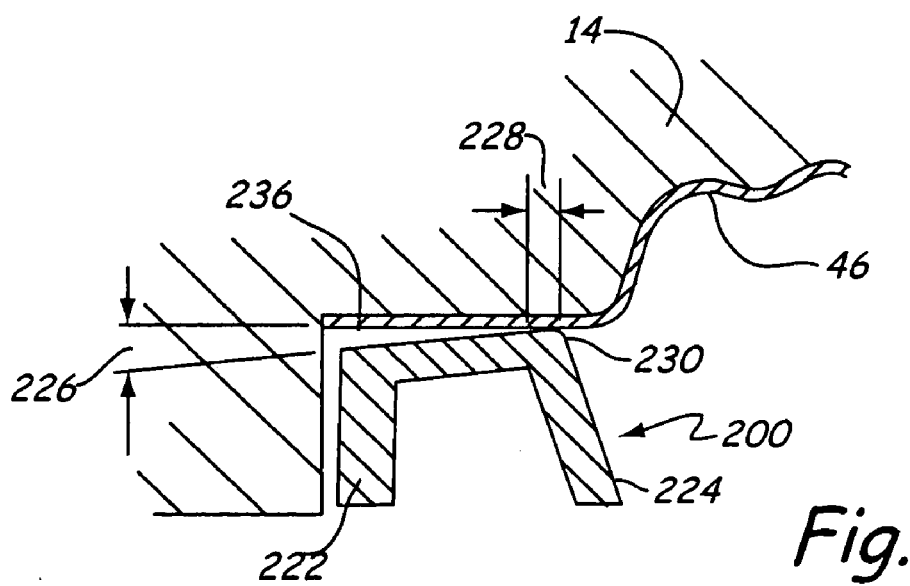

FIG. 4 is a side cross-sectional view and includes inset A of a seal 200 in accordance with one example embodiment of the present invention. Similarly, FIGS. 5A and 5B are side cross-sectional views of seal 200. Seal 200 includes a metal ring 202 having an interior diameter or circumference 206 and an exterior diameter circumference 203. The metal ring is preferably formed of a spring material having suitable corrosion resistance to allow exposure to the process fluid. For example, cold worked stainless steel or metal sold under the tradename Inconel, a high strength non-magnetic steel may be used.

FIGS. 5A and 5B more clearly show an interior or inner circumference 224 and an exterior or outer circumference 222. FIG. 5A also illustrates an annular shoulder region 230. FIG. 5A illustrates seal 100 prior to attaching the seal 100 to the transmitter 14. An annular contact area 228 is formed along shoulder 230 by applying a loading force during the attachment process. A back taper 236 is provided which has height 226 which is greater than the weld distortion which arises due to the welding process. While the seal 200 is held in this position, the weld (232 in FIG. 5B) is applied. The weld 232 can be, for example, formed using a laser weld to thereby attach the seal 200 to the transmitter 14.

FIG. 5B is a cross-sectional view showing the configuration of seal 200 following the welding process. As illustrated in FIG. 5B, any welded distortion due to the shrinkage of weld 232 is counteracted by the preload such that shoulder 230 remains in a consistent and stable contact along its circumference with the surface of transmitter 14 and diaphragm 46.

The bevel or back taper 236 is preferably configured and of sufficient depth so that when the pre-loading force is applied during the welding process, some portion of the gap 226 provided by taper 236 remains. The weld 232 then preserves the contact at shoulder 230 and provides some residual load along the interior annulus formed by the shoulder 230. This residual load eliminates, or substantially reduces, the gap 126 of prior art configurations such as that shown in FIG. 3A. Thus, as the gap has been reduced, when different flanges and/or loads or conditions are applied to the seal 200, the contact area along shoulder 230 does not change appreciably. By reducing any change or variation in the contact area, due to any extraneous force applied to the diaphragm 46, errors in the measured pressure are reduced.

Figure 6:
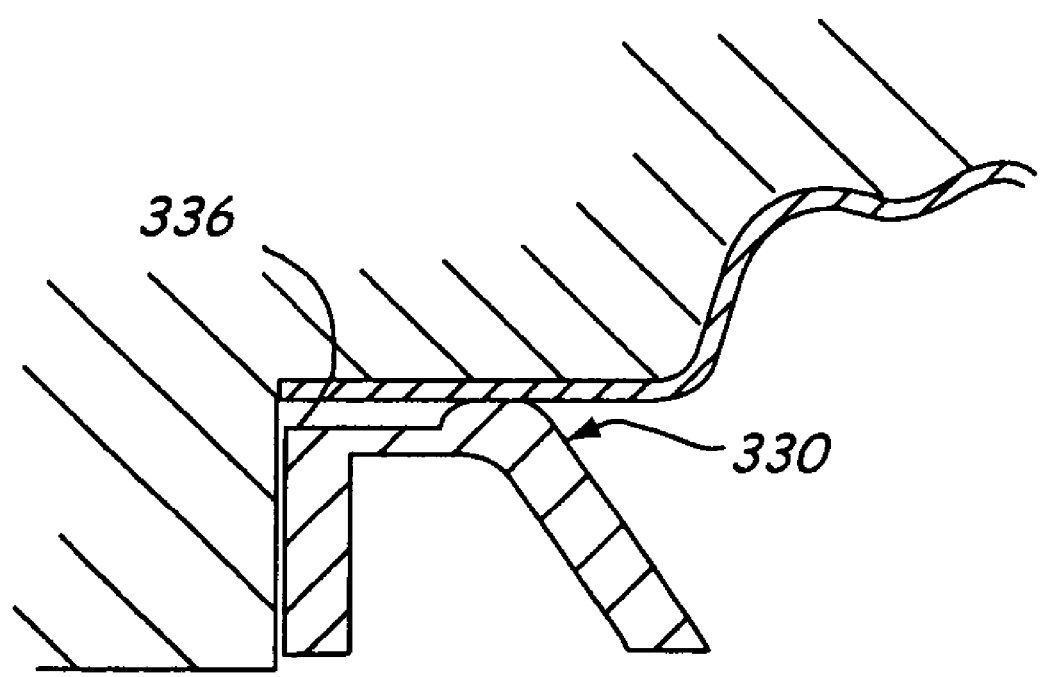
FIG. 6 shows an alternative embodiment in which the inner annular shoulder portion is formed as an enlarged area.

In an alternative embodiment as shown in FIG. 6, the inner annular shoulder portion 330 is formed as an enlarged area such that it extends beyond the exterior annular area 336 of the ring. In this way, as the ring is preloaded, contact is assured at the inner shoulder 330 and the contact remains after the preload is removed.

The present invention also includes a method of attaching a seal to a transmitter which reduces variations in the force applied to the diaphragm when the seal is placed under load. In accordance with the method, a seal 200 is preloaded during the welding or other attachment process such as shown in FIG. 5A. Following the attachment, the preload is removed and the annular shoulder 230 remains substantially in contact with the diaphragm 46 despite any contraction in the weld 232.

Although a laser weld has been specifically described herein, the present invention is applicable to any attachment technique which would cause distortions in the seal 200 following the attachment process. Typically, the seal 200 comprises a metal, however other can be used as desired. A sealing or fill material 120 can be used with seal 200. Any appropriate material can be used including, for example, glass filled Teflon®, graphite filled Teflon®, Viton®, or other materials known in the art for producing O-rings or the like.

Although the present invention has been described with reference to preferred embodiments, workers skilled in the art will recognize that changes may be made in form and detail without departing from the spirit and scope of the invention. The present invention can be applied and used with other seal configurations and is not limited to the particular configurations shown herein. Other types of lips, hinged or coated flanges can be used or materials or fillings. The back taper along the outer diameter of the flange can be achieved using any technique including machining. In some embodiments, the taper is achieved due to the application of the preload force or other technique to achieve the desired profile.

What is claimed is:

1. A process control instrument for coupling to a process, the process control instrument being attachable to a metal flange having a first passageway adapted to be filled with process fluid, the process control instrument comprising:
   a body having an opening adjacent to the first passageway for receiving process fluid from the first passageway when the process control instrument is attached to the flange; and
   a diaphragm disposed across the opening for fluid communication with the process fluid;
   a seal adapted to be positionable against the flange to prevent process fluid from leaking past the flange and diaphragm, where the seal comprises a ring positioned in the opening and coupled to the body, the ring being substantially in contact with the diaphragm along an inner annular shoulder when the body is not attached to the flange (unloaded).

2. The apparatus of claim 1 wherein the seal includes a taper along an exterior annulus portion.

3. The apparatus of claim 1 including a fill material in the seal.

4. The apparatus of claim 1 wherein the seal is welded to the body.

5. The apparatus of claim 4 wherein the weld comprises a laser weld.

6. The apparatus of claim 1 including a flange configured to load the seal.

7. The apparatus of claim 6 wherein a sealing force which couples the flange to the body causes deformation of the seal from an unloaded state.

8. The apparatus of claim 7 wherein deformation occurs along a gap between an exterior annulus and the body.

9. The apparatus of claim 8 wherein the deformation is a direction away from the surface of the flange.

10. A method of attaching a seal to a process transmitter, comprising:
    preloading the seal to urge an inner annular portion of the seal against an isolation diaphragm of the transmitter;
    attaching the seal to the transmitter while applying the preloading; and
    removing the preloading following the attaching whereby an annular shoulder of the seal remains in contact with the diaphragm.

11. The method of claim 10 wherein the seal includes a taper along an exterior annulus.

12. The method of claim 10 including placing a fill material in the seal.

13. The method of claim 10 wherein attaching the seal comprises welding.

14. The method of claim 13 wherein the weld comprises a laser weld.

15. The method of claim 10 including applying a flange configured to load the seal.

16. The method of claim 15 wherein a sealing force which couples the flange to the body causes deformation of the seal from an unloaded state.

17. The method of claim 16 wherein deformation occurs along a gap between an exterior annulus and the body.

18. The method of claim 16 wherein the deformation is a direction away from the surface of the flange.

* * * * *